Patented Aug. 15, 1944

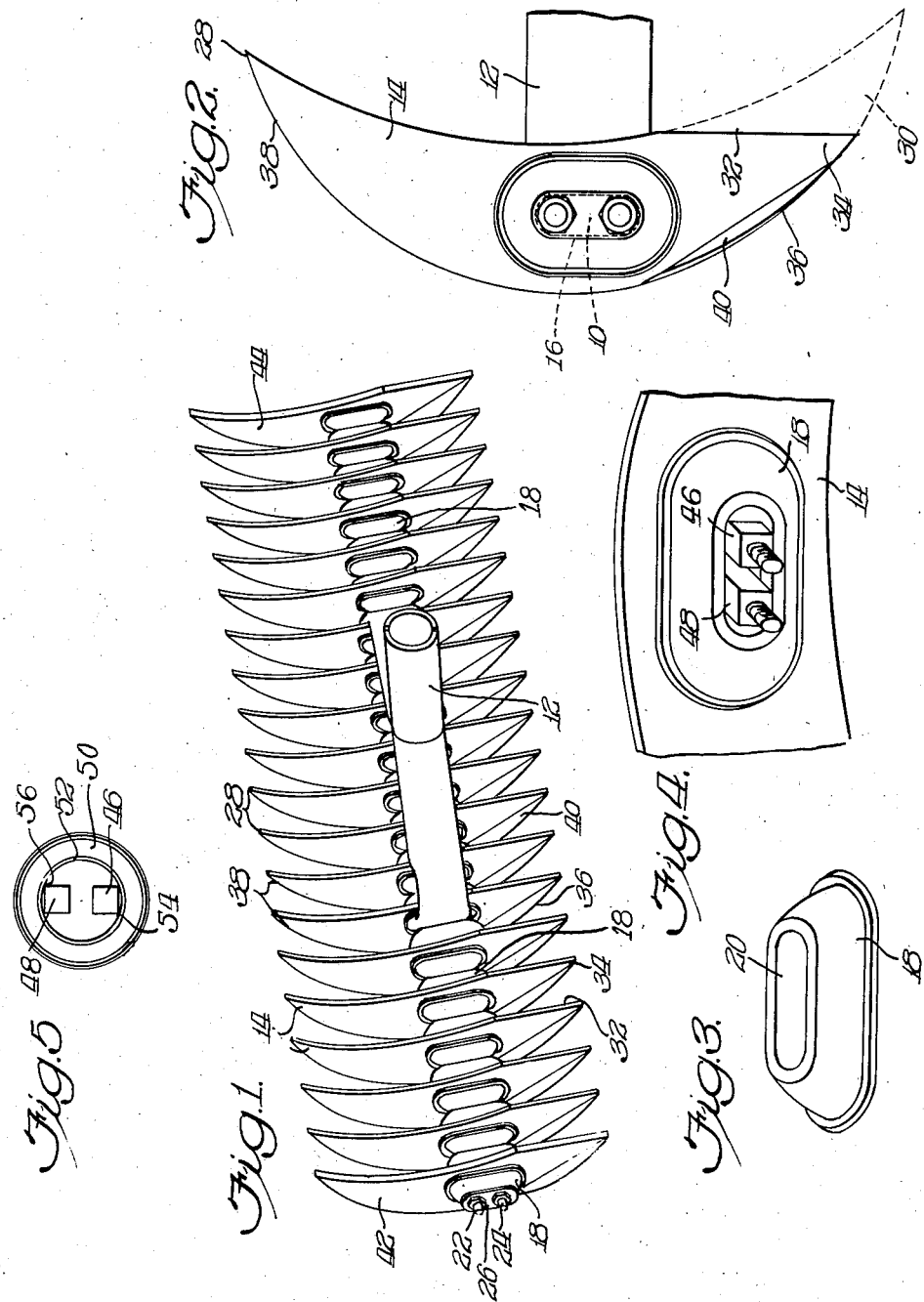

2,355,840

UNITED STATES PATENT OFFICE 2,355,840

GARDEN RAKE

Paul Ales, Chicago, and Edgar C. Robertson, Steger, Ill.

Application March 18, 1942, Serial No. 435,172

4 Claims. (Cl. 56—400.21)

This invention relates to garden rakes and more particularly to a garden rake of the type shown in the patent to Roy W. Eifert, No. 1,894,306, dated January 17, 1933.

The first object of this invention is to provide an improved means for assuring alignment of the tips of the crescent-shaped tines in rakes where the tines are independent members mounted on a frame. In the crescent-shaped rake of Eifert's mentioned above, the alignment of the tips of the tines is dependent upon a minimum amount of play between the hole 3 in each tine or blade 2 (see Figure 3 of the Eifert patent) and the cross bar 1. The alignment obtained by employing tolerances warranted by this type of device is not very good.

One of the features of this invention is the provision of a cross bar having a cross sectional configuration wherein its cross sectional dimension at right angles to the handle is substantially greater than its cross sectional dimension parallel to the handle. Applicant employs a bar having a generally rectangular cross section but with rounded edges or a bar generally elliptical in cross section. The mounting holes in the tines are slightly larger and of the same configuration as the cross bar.

A second object of this invention is to convert the limited-purpose, crescent-type rake of Eifert's to an all-purpose rake. The Eifert rake was originally designed primarily for raking leaves and the like from a fairly smooth surface such as a lawn. As a garden rake, the tines are too thin to obtain a proper action. One of the features of the present invention is the truncating of the tips of the tines on one side of the rake along a plane positioned substantially perpendicular to the handle. When the rake is held at a normal angle such as 30 to 60 degrees with the horizontal, with these truncated tines down, the tines will not ride the surface which is being raked as in the case of the fully curved tips, but will tend to dig into the surface.

In conjunction with this digging-in action, applicant flanges over the convex edge adjoining the truncated portion of each tine. These flanged tines develop a plowing action in loose earth.

A further object of this invention is to strengthen a portion of the Eifert rake which receives an excessive amount of abuse. The crescent-shaped tines are of a comparatively light gauge of steel, primarily for the purpose of holding down the weight of the rake. When a rake is dropped, it may land on the end tine. One of the features of this invention is the provision of a heavy tine at each end of the rake.

These and such other objects as may hereinafter appear are obtained in two embodiments of the invention shown in the accompanying drawings comprising one sheet wherein:

Figure 1 is a perspective view of the rake;

Figure 2 is an end view in elevation of the rake;

Figure 3 is a perspective view of a spacer member used between the tines;

Figure 4 is a perspective view of a second embodiment of the invention employing a double cross bar frame; and Figure 5 illustrates how a circular spacer member may be employed in conjunction with a noncircular frame member or members.

Continuing to refer to the drawings, the numeral 10 identifies a cross bar which is generally rectangular in cross section, see Figure 2, wherein the long, cross sectional dimension of the cross bar 10 is at substantially right angles to the axis of a handle holder 12, while the short cross sectional dimension of the cross bar 10 is substantially parallel to the axis of the handle holder 12.

A plurality of crescent-shaped tines 14 have substantially centrally of their length a hole 16 having the same configuration as a cross section of and being slightly larger than the cross bar 10. These tines 14 are disposed at equal intervals along the cross bar 10 by means of two spacer members such as 18 positioned between each tine and the adjoining tine. Each spacer member is bowl-shaped with a hole 20 in it of the same size and shape as the hole 16 in the tines 14. Two spacer members are positioned back to back as shown in Figure 1 in order that their flat-rimmed surfaces may engage the surfaces of the tines and hold them rigidly in right angle relationship to the cross bar 10. The outer ends of the cross bar 10 may carry double threaded portions 22 and 24 and with the aid of a washer 26, nuts may be pulled down tight to hold the tines in assembled relationship on the cross bar. The handle holder 12 is assembled on the cross bar in much the same manner as disclosed by the Eifert patent.

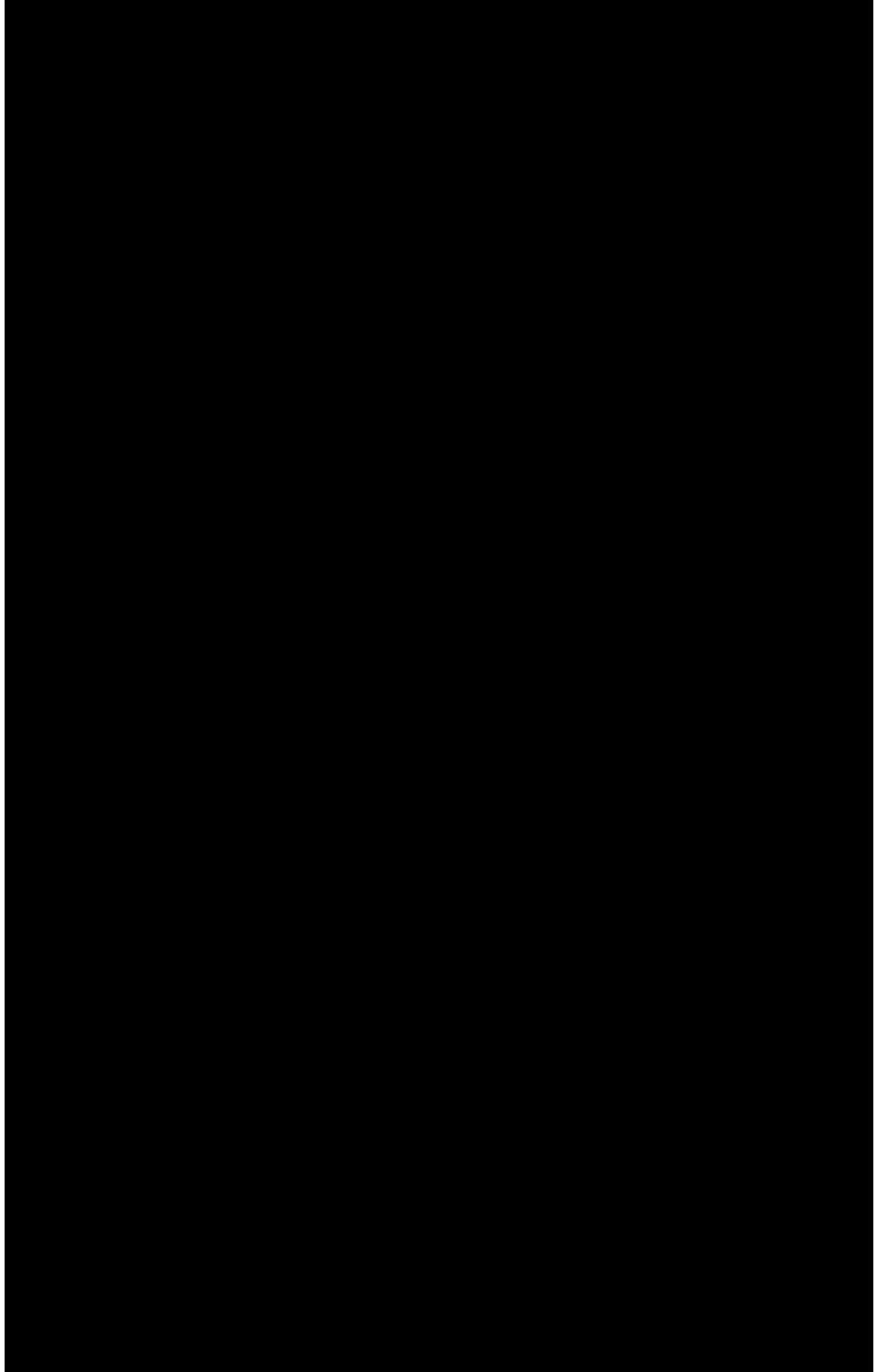

Attention is now invited to the size and configuration of the cross bar 10. With a rake made to given tolerances which for commercial reasons are not very close, alignment of the tips 28 of the tines 14 is difficult. Moreover, unless the alignment is very exact, the usability of the rake is substantially impaired. By employing the cross bar of larger cross section, the same tolerances may be used with greater accuracy in alignment